Nov. 15, 1966          E. CHESLOW          3,285,117

DRUM HEAD

Filed April 5, 1965

Inventor
Ernest Cheslow
By
Dressler, Goldsmith, Clement, Gordon & Shiff
Attorneys

3,285,117
DRUM HEAD
Ernest Cheslow, Glencoe, Ill., assignor to David Wexler & Co., a corporation of Illinois
Filed Apr. 5, 1965, Ser. No. 445,344
7 Claims. (Cl. 84—414)

This invention relates to a novel construction of a drum head formed of synthetic plastic sheet material.

Synthetic plastic vibratory diaphragms have been widely used in musical instruments as substitutes for diaphragms formed of animal skin. One of the plastic materials that has been used with great success as vibratory diaphragms in musical instruments such as drums, is the biaxially oriented film of the condensation polymer of ethylene glycol and terephthalic acid, produced by E. I. du Pont de Nemours & Co., Inc., under the trademark Mylar. Although the vibratory diaphragms of the illustrative embodiments of the present invention comprise Mylar sheet, it is to be understood that no limitation to the use of Mylar as a vibratory diaphragm is intended and other synthetic plastic materials may be used successfully in practicing the invention.

Mylar is a thermoplastic material which performs effectively in a drum head construction for several reasons, a few of which include (1) its non-susceptibility to moisture and changes in the weather, (2) its great flexibility, durability and tensile strength, and (3) its production economy. As compared with animal skins, Mylar vibratory diaphragms give a relatively constant tone and do not require frequent tension adjustments.

Synthetic plastic drum heads overlie the open portions of drum barrels, and are generally connected to a ring or hoop which encircles the drum barrel and is clamped thereto by means of adjustable clamping members which enable the tension of the drum head to be varied. In prior art constructions, the connection of the plastic sheet to the ring or hoop has often been a considerable source of difficulty.

The present invention provides a simplified drum head construction wherein the periphery of the synthetic plastic vibratory diaphragm forms a channel. In one embodiment of the invention, the channel has a generally U-shaped cross sectional configuration. The channel is filled with a solid composition which is chemically bonded with the inner surface thereof to form a hoop. It is to be understood that the channel may be completely filled or may be partially filled, provided that there is enough solid composition to form a peripheral hoop.

A further explanation of the invention is provided in the following description, and is illustrated in the accompanying drawings, in which.

Figure 1:
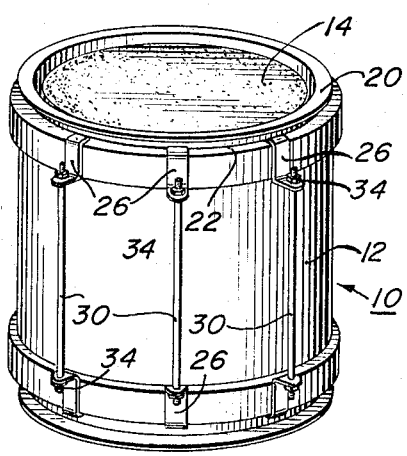
FIGURE 1 is a perspective view of a drum having a pair of heads which utilize the principles of the present invention.
Figure 2:
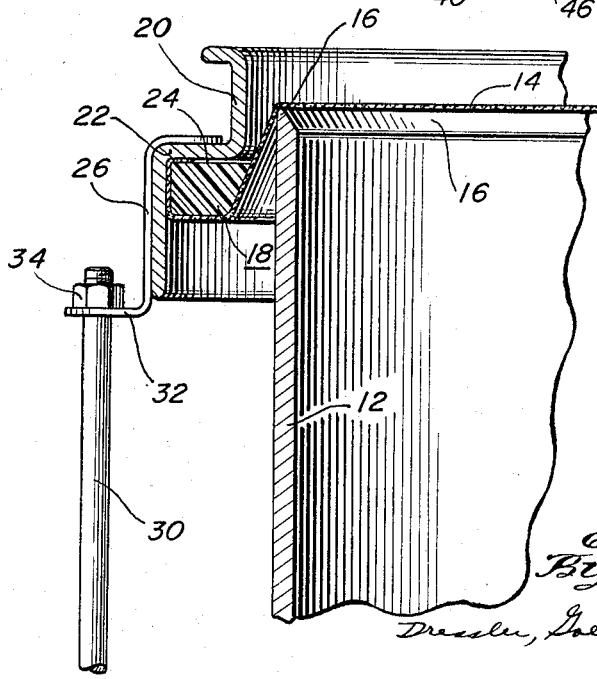
FIGURE 2 is a fragmentary perspective view through a section of the drum of FIGURE 1.

With reference to FIGURES 1 and 2, there is shown a drum 10 which includes a generally cylindrical drum barrel 12 defining open portions at both the bottom and top thereof. A pair of drum heads 14 are disposed over the open portions of the drum barrel to enclose the same. Drum heads 14 consist of Mylar sheet which overlies the annular extremities 16 of the drum barrel. The outer periphery of the drum head 14 comprises a hoop 18 which has an inner diameter that is greater than the external diameter of the drum barrel 12.

A counter hoop 20 having a horizontally extending shoulder 22, is positioned over the outer horizontal surface 24 of hoop 18 so that shoulder 22 engages surface 24. A number of clamps 26 having an inner surface configuration that generally conforms with the outer surface of shoulder 22 and the outer surface of the lower portion of the counter hoop contiguous therewith, engage the counter hoop. The top and bottom of the drum are symmetrically constructed whereby bolt members 30, which are threaded at opposite ends, can extend through the holes defined by end portions 32 of the clamps. The tension of the Mylar drum heads is adjusted by means of nuts 34 which are provided at the opposite ends of bolts 30.

The manner in which hoop 18 is formed will now be described. As shown most clearly in FIGURES 2 and 3, the peripheral portion of the Mylar head 14 takes the form of a channel 40 having a generally U-shaped cross sectional configuration. If desired, the channel can be V-shaped and/or folded over to extend in a plane that is parallel to the plane of the major portion of the drum head (as illustrated in FIGURE 2), or it can take any configuration that will allow it to contain a composition in liquid form. To obtain the desired configuration, the Mylar sheet is first bent about an appropriate die. In some cases one die will be sufficient while in other cases a series of dies will be required to bend the Mylar sheet to the desired configuration. The channel 40 formed by the die is then filled with a resinous bonding material 42 in a liquid state, and the material 42 is allowed to harden and become chemically bonded with the inner surface 44 of channel 40.

Any material that can be applied in a liquid state and hardened to chemically bond with the inner surface of the channel can be used in the fabrication of the drum head of the present invention. For example, a resin comprising liquid epoxy (Epon 80, a synthetic resin produced by Shell Chemical Corp., possessing terminal epoxide groups; 250 grams), polysulfide rubber (50 grams) and a curing agent comprising triethylenetetramine (25 grams) may be utilized as the bonding composition. After the bonding composition has hardened, the Mylar sheet will permanently take the general form shown in the drawing, and the outer periphery of the plastic sheet will define a hoop which is adaptable for engagement with a drum counter hoop and clamping arrangement.

Figure 4:
FIGURE 4 is a fragmentary cross sectional view of another embodiment of a drum head construction in accordance with the principles of the present invention.
Figure 3:
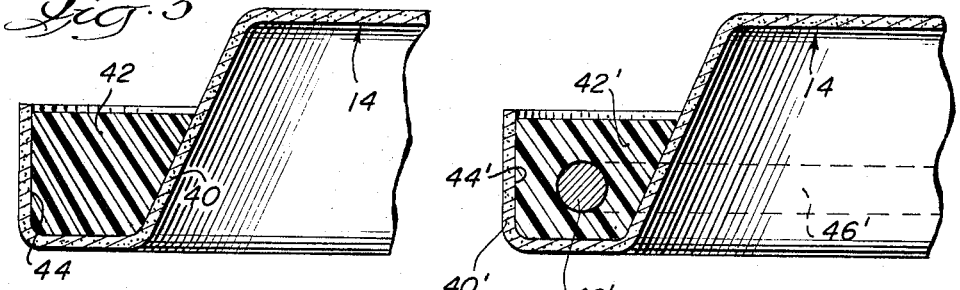
FIGURE 3 is a fragmentary cross sectional view of one embodiment of the drum head constructed in accordance with the principles of the present invention.

Another embodiment of the present invention is shown in FIGURE 4, wherein the outer periphery of the Mylar sheet is bent to form a channel 40' having a generally U-shaped cross sectional configuration, in a manner similar to the formation of the channel in the FIGURE 3 embodiment. A resinous bonding material 42', which can be the same as the bonding composition 42 of the FIGURE 3 embodiment, is poured in liquid form into channel 40', to chemically bond with the inner surface 44' of channel 40'. Prior to hardening of the material 42', an annular metal ring 46' is inserted into the channel 40' and allowed to become embedded within the bonding material 42'. Ring 46' provides an additional reinforcement for the outer periphery of the drum head, when such is desired.

From the foregoing it is seen that a synthetic plastic drum head is provided by the present invention, which drum head can be constructed in a highly efficient manner with a minimum of component parts. The drum head does not require the numerous mechanical anchors and other components required by prior art drum heads, which subject the prior art systems to high production and material costs.

Although several embodiments have been shown and described, it is to be understood that various modifications and substitutions can be made without departing from the spirit and scope of the present invention.

What is claimed is:

1. A drum head which comprises: a synthetic plastic vibratory diaphragm adapted to fit over the open portion defined by a drum barrel, the periphery of said diaphragm forming a channel; and a solid composition filling said channel, said solid composition being chemically bonded with the inner surface of said channel.

2. A drum head which comprises: a Mylar vibratory diaphragm adapted to fit snugly over the open portion defined by a drum barrel, the outer edge of said diaphragm being bent to form a generally U-shaped channel, said channel being filled with a resinous material that is bonded to the inner surface of said channel to form a rigid circumferential member.

3. A vibratory diaphragm adapted to be adjustably clamped to a drum barrel, which comprises: a generally circular synthetic plastic sheet, the periphery of which forms a generally U-shaped channel, said channel being filled with a resinous material that is bonded to the inner surface of said channel to form a circumferential hoop adapted for engagement by a plurality of adjustable drum clamps, and a rigid reinforcing ring embedded within said resinous material.

4. A drum which comprises: a generally cylindrical drum barrel, the top and bottom thereof defining open portions; a pair of synthetic plastic vibratory diaphragms, each fitting snugly over the open portions defined by said drum barrel, the periphery of said diaphragms each forming a channel having a generally U-shaped cross sectional configuration, said channels each being filled with a solid composition that is chemically bonded with the inner surface of said channels to form a pair of hoops each having a larger inner diameter than the external diameter of said drum barrel; and means connected to said hoops for tensioning said vibratory diaphragms.

5. A vibratory diaphragm adjustably clamped to a drum barrel, which comprises: a generally circular thermoplastic sheet, the periphery of which defines a channel, said channel being filled with a resinous material that is bonded to the inner surface thereof to form a circumferential hoop engaged by a plurality of adjustable drum clamps, the end of said sheet being folded over to extend in a plane parallel to the plane of the major portion of said sheet.

6. A method of making a drum head which includes the steps of shaping a thermoplastic sheet material at the periphery thereof to provide an annular channel that is capable of containing a resinous material in liquid form, filling said channel with a resinous material in liquid form, and allowing the resinous material to harden to chemically bond with the inner surface of the channel thereby forming a peripheral hoop.

7. A method of making a drum head which includes the steps of shaping a thermoplastic sheet material at the periphery thereof to provide an annular channel that is capable of containing a resinous material in liquid form, inserting a rigid ring member in said channel to provide reinforcement for the drum head, filling said channel with a resinous material in liquid form, and allowing the resinous material to harden to chemically bond with the inner surface of the channel thereby forming a peripheral hoop.

References Cited by the Examiner

UNITED STATES PATENTS

| | | | |
|---|---|---|---|
| 2,934,989 | 5/1960 | Belli et al. | 84—414 |
| 2,979,981 | 4/1961 | Ludwig | 84—411 |
| 3,055,253 | 9/1962 | Loughborough | 84—411 |

FOREIGN PATENTS

| | | |
|---|---|---|
| 1,342,171 | 9/1963 | France. |
| 870,046 | 6/1961 | Great Britain. |
| 995,993 | 6/1965 | Great Britain. |

RICHARD B. WILKINSON, *Primary Examiner.*

LOUIS J. CAPOZI, *Examiner.*

C. M. OVERBEY, *Assistant Examiner.*